United States Patent
D'Amico

(10) Patent No.: US 9,301,587 B2
(45) Date of Patent: Apr. 5, 2016

(54) HAIR COLOR (OR DYE) STORAGE, DISPENSING AND MEASUREMENT (OR MEASURING) SYSTEM

(71) Applicant: Stephen D'Amico, Hermosa Beach, CA (US)

(72) Inventor: Stephen D'Amico, Hermosa Beach, CA (US)

(*) Notice: Subject to any disclaimer, the term of this patent is extended or adjusted under 35 U.S.C. 154(b) by 241 days.

(21) Appl. No.: 14/155,353

(22) Filed: Jan. 14, 2014

(65) Prior Publication Data

US 2014/0196221 A1    Jul. 17, 2014

Related U.S. Application Data

(60) Provisional application No. 61/752,398, filed on Jan. 14, 2013, provisional application No. 61/887,901, filed on Oct. 7, 2013.

(51) Int. Cl.
| | | |
|---|---|---|
| *B01F 15/04* | (2006.01) | |
| *A45D 19/00* | (2006.01) | |
| *G01F 11/02* | (2006.01) | |
| *B01F 13/00* | (2006.01) | |

(52) U.S. Cl.
CPC ............ *A45D 19/0008* (2013.01); *A45D 19/00* (2013.01); *B01F 13/0023* (2013.01); *B01F 15/0462* (2013.01); *G01F 11/027* (2013.01); *A45D 2019/0066* (2013.01); *A45D 2200/055* (2013.01); *A45D 2200/058* (2013.01); *A45D 2200/25* (2013.01)

(58) Field of Classification Search
CPC ............ A45D 19/00; A45D 2200/055; A45D 2200/058; A45D 2200/25; B01F 13/0025; B01F 15/0462
USPC .............................. 141/2, 9, 27, 100, 104, 113
See application file for complete search history.

(56) References Cited

U.S. PATENT DOCUMENTS

| | | | | |
|---|---|---|---|---|
| 3,718,234 A * | 2/1973 | Bagguley | ............. | B65D 83/384 222/135 |
| 4,473,097 A * | 9/1984 | Knickerbocker | ....... | G01F 19/00 141/113 |
| 4,712,593 A * | 12/1987 | Zulauf | ................. | B67D 7/0227 141/113 |
| 6,089,408 A | 7/2000 | Fox | | |
| 6,202,895 B1 * | 3/2001 | Fox | ........................ | A45D 19/02 141/104 |
| 6,935,386 B2 * | 8/2005 | Miller | ................. | B01F 13/1055 141/104 |

(Continued)

FOREIGN PATENT DOCUMENTS

EP        1 442 762 A2    8/2004

OTHER PUBLICATIONS

PCT International Search Report; PCT App. No. PCT/US14/72094.

*Primary Examiner* — Nicolas A Arnett
(74) *Attorney, Agent, or Firm* — Edwin Tarver; Lanson & Tarver, LLP

(57) ABSTRACT

An apparatus and system for preparing a hair coloring includes a graduated syringe and a container filled with a pigmented hair dye. The container includes an air-tight chamber and an opening, and also includes an engagement mechanism for installing the container on a rack for support. An air-tight reclosing seal at the opening allows the syringe to engage the air-tight reclosing seal, and extract the hair dye from the air-tight chamber. When the syringe is disengaged from the container, the air-tight reclosing seal closes off the air-tight chamber and permitting a known quantity of the hair dye to be withdrawn from the container into the syringe, allowing an accurate and repeatable quantity of hair dye to be dispensed from the container.

17 Claims, 9 Drawing Sheets

(56) References Cited

U.S. PATENT DOCUMENTS

| | | | |
|---|---|---|---|
| 6,991,004 B2 * | 1/2006 | Kaufhold | B01F 13/1055 141/104 |
| 7,082,970 B2 * | 8/2006 | Bartholomew | B01F 13/1069 141/104 |
| 7,147,012 B2 * | 12/2006 | Kaufhold | B01F 13/1055 141/104 |
| 7,185,789 B2 * | 3/2007 | Mink | B01F 13/1058 222/135 |
| 7,347,344 B2 * | 3/2008 | Engels | B01F 13/1058 222/1 |
| 7,360,564 B2 * | 4/2008 | Engels | B01F 13/1058 141/100 |
| 7,407,055 B2 | 8/2008 | Rodriguez | |
| 7,475,710 B2 * | 1/2009 | Bartholomew | B01F 13/1069 141/104 |
| 7,624,769 B2 * | 12/2009 | Bartholomew | G07F 11/165 141/104 |
| 7,654,416 B2 * | 2/2010 | Buining | B01F 13/1058 222/135 |
| 7,690,405 B2 * | 4/2010 | Miller | B05B 1/28 141/104 |
| 7,963,303 B2 | 6/2011 | Saranow | |
| 7,972,056 B2 * | 7/2011 | Lontoc | B01F 7/161 366/150.1 |
| 8,336,582 B2 * | 12/2012 | Saranow | A45D 19/00 141/104 |
| 8,393,363 B2 * | 3/2013 | Saranow | A45D 44/005 141/104 |
| 8,567,455 B2 * | 10/2013 | Saranow | A45D 19/00 141/104 |
| 8,897,915 B2 * | 11/2014 | Saranow | G06Q 10/10 700/233 |
| 8,977,389 B2 * | 3/2015 | Witchell | G01F 1/42 700/233 |
| 9,007,588 B1 * | 4/2015 | Igarashi | G05D 11/132 356/402 |
| 9,177,339 B2 * | 11/2015 | Saranow | G06Q 30/0621 |
| 2005/0211261 A1 * | 9/2005 | Capristo | A45D 19/02 132/112 |
| 2008/0189876 A1 * | 8/2008 | Trigg | A61K 8/585 8/405 |
| 2012/0048880 A1 | 3/2012 | Damolaris | |
| 2012/0152406 A1 * | 6/2012 | Bartholomew | B65B 25/00 141/104 |
| 2013/0167865 A1 * | 7/2013 | Kerr | B65D 75/5811 132/221 |
| 2015/0253782 A1 * | 9/2015 | Igarashi | G05D 11/132 700/265 |

* cited by examiner

HAIR COLOR (OR DYE) STORAGE, DISPENSING AND MEASUREMENT (OR MEASURING) SYSTEM

This application claims the benefit of the filing date of provisional application No. 61/752,398, filed on Jan. 14, 2013 and provisional application No. 61/887,901 filed on Oct. 7, 2013.

BACKGROUND

Hair coloring systems currently available on the market typically comprise a series of capped dye tubes, such as collapsible aluminum tubes, each containing a different color high-viscosity paste, or a bottle-type container holding a liquid. During the hair coloring process, a stylist dispenses the desired amount of a particular base pigment into a mixing receptacle. Additional pigments must be dispensed and mixed with the base to achieve a desired color. A developer or fixing agent will be added as well. Once the pigments and developer dispensed and blended, the mixture may be applied to a client's hair.

These hair coloring systems have several drawbacks. When adding color from a tube, a user one is prompted to "squeeze to a line," wherein it is impossible to identify small amounts, such as milliliters. Because hair dye is obtained by hand from tubes or bottles, it is impossible to know the quantity of a particular pigment dispensed. Dyes must be measured accurately since a change of even 0.1 ml can alter the hue of a color mixture from one batch to the next. Independent studies have found that the best efforts using tube markings were only accurate to +/−50% of the total volume. The accuracy of color dispensed with a syringe is to within +/−1% of the total volume. Accurate measuring equipment, which is common in a laboratory setting, is rarely found in conventional salons. For this reason, exactly reformulating a color can be difficult if not impossible.

The bottles and tubes from which colors are dispensed are also not easily organized in a salon setting. Due to the speed at which hair professionals work and the numerous clients on which they work over the course of a given day, containers usually end up haphazardly thrown in drawers or on shelves, forcing stylists to search for a desired color among many disorganized dyes.

Furthermore, because of the nature of aluminum tubes, i.e., capped cylinders similar to toothpaste tubes, it is difficult to dispense all of the dye from a single tube, resulting in wasted product. Approximately 25% of the product in a typical dye tube may be wasted due to a user's inability to completely dispense the product, or through drying and discoloration caused by oxidation of the dye from leaving off the cap. Tube-based dyes are also high in viscosity which makes them difficult to manage.

Some attempts have been made to solve these problems. U.S. Pat. No. 7,407,055 to Rodriquez discloses a hair roots coloring kit, including a squeeze tube of hair dye and measuring devices such as syringes, a measuring cup and a pipette for establishing a dye quantity. In particular, a syringe may be inserted into a squeeze tube to retrieve hair dye. This invention contemplates conventional aluminum or similar hair dye squeeze tubes, and a dye comprising a viscous, high viscosity paste. For this reason, the dye must be pushed into a syringe by compressing the dye tube, rather than extracting dye with the syringe plunger. Furthermore there is no sealing arrangement between the tube and syringe, so that users must maintain them together under manual pressure to avoid leakage. Additionally, since there is no oxygen barrier between the syringe and the distribution end of the dye tube when uncapped, oxidation will occur.

U.S. Pat. No. 7,963,303 to Saranow, et al. discloses a hair dye apparatus and method having a computer screen for selecting a color from a color palette, and a dye quantity. The apparatus indicates the dyes a user will mix, and the user dispenses the dyes in a bowl atop a small electronic scale. While this apparatus keeps individual color containers separate and organized, it is bulky, complicated to use, and lacks the accuracy needed for professional applications. Also, it fails to solve the problem of wasted product.

U.S. Pat. Publication No. 2012/0048880 to Damolaris also discloses a dispensing apparatus for hair dye. In Damolaris, a user enters information relating to a desired color using a computer terminal, and the apparatus dispenses a predetermined amount of developer. While this apparatus presumably dispenses all of the dye in a container, it requires an expensive computer processor and substantial user training to operate. This invention fails to teach measurement or dispensing color. Rather, it's sole function is to measure developer.

For these reasons, commercial hair dye systems as known in the art are both wasteful and prone to error. Consequently, there is a need for a hair coloring system for commercial salons and professional stylists that allows users to accurately measure the pigments they use, and which also allows users to extract virtually all of a dye product from its packaging. Further, there is a need for a system that remains organized, allowing stylists to quickly and easily find colors to mix.

SUMMARY

An apparatus for preparing an accurate and repeatable hair coloring includes a graduated measuring and dispensing vessel and a container having a hair dye contained in an air-tight configuration in the container. The container includes an air-tight chamber, an opening, and further includes a means for engaging the container with a container holder to support it. This may take the form of a rack in which the container sits, may include pegs from which the container hangs or provide a similar arrangement in which the container is suspended for easy access by a hair color professional.

An air-tight reclosing seal is preferably located at the opening, such that when the measuring and dispensing vessel engages the air-tight reclosing seal, the hair dye may be extracted from the air-tight chamber, and when the measuring and dispensing vessel is disengaged from the container, the air-tight reclosing seal closes off the air-tight chamber. In this manner, a user may withdraw a known quantity of the hair dye from the container into the measuring and dispensing vessel, combine it with known quantities of other color hair dyes, thereby allowing an accurate quantity of total hair dye to be dispensed from the container enabling the hair professional to mix an accurate and repeatable hair dye color.

In one embodiment, the container includes an engaging device at the opening for releasably connecting the measuring and dispensing vessel to the container in an air-tight manner to prevent the measuring and dispensing vessel from inadvertently disengaging from the container. Additionally, the container may include an outer layer made of a semi-rigid poly-plastic material, such that in one embodiment the container is essentially a collapsible bag while in another, it retains a uniform outer shape while an interior collapsible bag deforms. Preferably, the opening is at the bottom of the container relative to a container label.

In addition to an engaging device for retaining the container and the measuring and dispensing vessel in a locking configuration, in an alternative embodiment, to prevent hair dye from exiting the container when the measuring and dispensing vessel disengages the container, an air-tight reclosing seal, for instance a self-sealing orifice reducer may be used instead of or along with the engaging device for added security.

The container holder of the apparatus may take the form of a rack capable of holding multiple containers including a complete color line from a hair dye manufacturer. The multiple containers may hang suspended from the rack. In this manner the rack may hold multiple containers of the same color in a row, such that a full container can be brought forward when an empty container is removed from the rack. The rack may also be a holder in which multiple containers are seated. In this arrangement access to the bottom of the containers is provided by slots or holes in the rack.

Preferably the measuring and dispensing vessel comprises a graduated reusable device capable of accurately dispensing a known quantity of hair dye. In a preferred embodiment a syringe or syringe-type vessel is used. To assist in securely connecting the syringe with the opening of a container, the opening and the syringe may be equipped with a a luer-lock arrangement and the opening include a shut-off valve similar to an IV bag. In another embodiment an orifice reducer alone may be used.

Regardless of the locking arrangement of the syringe and opening, the syringe preferably includes an oxygen-free barrier to prevent oxidation or similar degradation of the hair dye and its color. One contemplated method of presenting an oxygen free barrier that resists the corrosive qualities of ammonia-based hair dye is a fluorination barrier treatment with which the surfaces of a syringe or similar vessel may be treated.

Once the syringe has extracted a desired quantity of hair color from one color, a user may engage the syringe with a second container bearing a second color. Once each quantity of hair dye is extracted from a container, the dyes may be mixed to obtain a predetermined color in a mixing bowl. Preferably the mixing bowl is made from a material that will not affect or take on the hues of the hair dye.

In an alternative embodiment, an apparatus for preparing hair dyes includes a graduated measuring and dispensing vessel, such as a syringe as described above, which is filled, i.e., pre-filled, with a predetermined amount of hair dye. Preferably a re-sealable cap is provided for covering an opening of the graduated measuring and dispensing vessel in an air-tight configuration to prevent oxidation and leakage of the hair dye prior to and after use.

A rack for storing multiple graduated measuring and dispensing vessels in an organized arrangement according to color is preferably provided in this embodiment, and allows them to be stored in rows of the same color to prevent running out of a particular hair dye. In this embodiment, the graduated measuring and dispensing vessel also includes an oxygen-free barrier.

Since the oxygen free barrier is opaque, a label may be included on the exterior of the graduated measuring and dispensing vessel corresponding to hair dye's color. Like prior embodiments, the surfaces of the measuring and dispensing vessel may be treated with a fluorination barrier treatment or similar preservative for oxygen-free storage. Furthermore, since the graduated measuring and dispensing vessel in this embodiment is essentially the container for a hair dye, it may include a handle for engaging the rack.

In order to use the hair coloring apparatus to mix an accurate color, a first container is provided having a quantity of hair dye contained in it. A first opening is provided in the first container, the opening presenting an air-tight re-closable seal on the first container. A graduated measuring and dispensing vessel, such as a syringe, capable of holding a predetermined quantity of hair dye is then provided, and is used to access the first opening with the graduated measuring and dispensing vessel, withdrawing a first predetermined quantity of hair dye from the first container and dispensing it in a mixing bowl.

A second container is then provided having a quantity of hair dye contained therein. Like the first container, the second container has a second opening with an air-tight re-closable seal on the second container. The second container is accessed with the graduated measuring an dispensing vessel and a second predetermined quantity of hair dye withdrawn from the second container. The second predetermined quantity of hair dye is then dispensed into the mixing bowl and mixed with the first predetermined quantity of hair dye.

Preferably, an oxygen barrier may be provided on the graduated measuring and dispensing vessel (e.g. syringe) to prevent degradation of the hair dye, particularly in an embodiment where the container takes the form of a syringe, obviating the need for connecting a syringe to a separate container of hair dye. Additionally a rack may be provided for the first container and the second container, or in an alternate embodiment hair dye-containing syringes to keep the colors organized. In a preferred embodiment, additional containers having quantities of different hair dye colors may be loaded in and dispensed from the rack.

REFERENCE NUMBERS

10. Individual Dye Containers
11. Labels
12. Rack
14. Syringe
15. Calibrated Scale
16. First Locking Adapter
17. Inner layer
18. Neck 19. Outer Layer
20. Second Locking Adapter
22. Air-Tight Seal
23. Locking Connector
24. Oxygen Free Barrier
26. Syringe Barrel
28. Syringe Graduations
30. Plunger
32. Marker
34. Handle
36. Syringe Rack
38. Indicia
40. Cap
42. Orifice Reducer

DESCRIPTION

Figure 1:
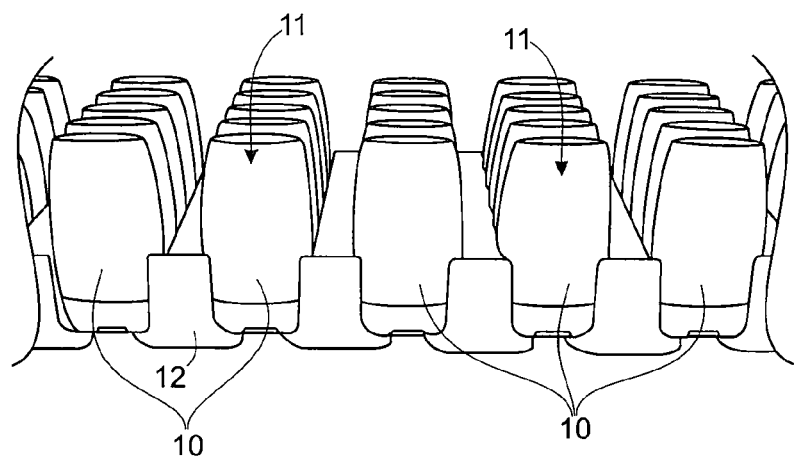
FIG. 1 is a perspective view of a series of hair dye containers disposed in a rack.

Referring to FIG. 1, the system comprises a series of individual dye containers 10. Like the aluminum hair dye tubes currently known in the art, each container preferably holds a different pigment, including base colors, highlighting tones, and developer (also known as "fixing solution"). Unlike tubes known in the art, the containers 10 are collapsible, and may comprise single-layer flex-packaging (e.g. IV bag type pouch (see FIG. 10)), or the containers 10 may be multi-layered, comprising a flexible and collapsible air-tight inner layer 17 containing a liquid dye, and an outer layer 19 made of a semi-rigid poly-plastic material (see FIG. 4).

In one embodiment the a laminated material forming a flexible container for holding hair dye or similar materials is contemplated. The laminated material may include a first, internal surface, and a second, external surface. Optionally, an intermediate foil barrier layer (not shown) may be included, separating the first and second surfaces.

The containers 10 are adapted to dispense their contents from the bottom relative to their labels 11, and are designed to removably install into a rack 12, which is adapted to hold multiple containers 10. Preferably, the rack 12 comprises a polymer-type horizontal and expandable storage adapted to hold numerous containers 10.

Figure 2:
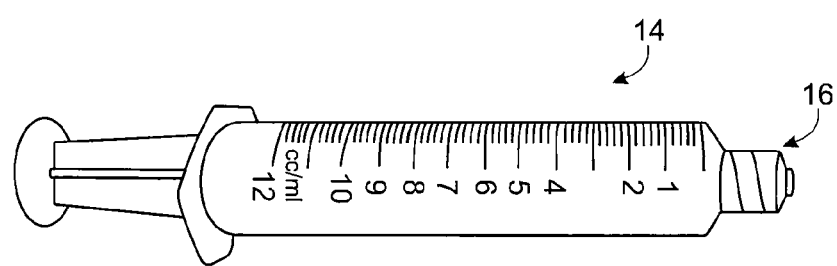
FIG. 2 is a side view of a graduated piston syringe with a locking adapter at the tip.

Referring to FIG. 2, A graduated piston syringe 14, having a calibrated scale 15 on the barrel for reading volume, and preferably clear to see the color of its contents, is used in connection with the containers 10. The syringe 14 preferably comprises a first locking adapter 16 such as a luer-lock at the tip, and is sized appropriately for normal volumes of hair dye. The first locking adapter 16 is designed to lockably engage a neck 18 (see FIG. 4) on a container 10. In the illustrated embodiment, the male portion of a luer-lock is shown at the tip of the syringe 14.

Figure 3:
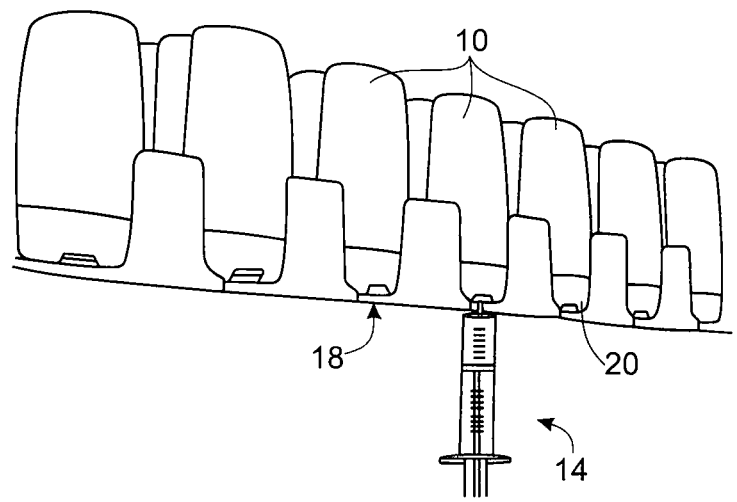
FIG. 3 is a perspective view of a syringe preparing to connect and withdraw hair dye from a container.
Figure 14:
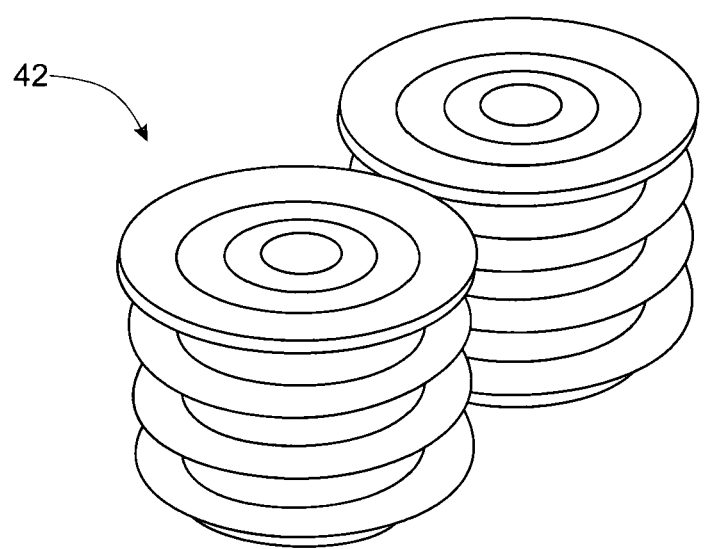
FIG. 14 shows an orifice reducer to be incorporated into the neck of a hair dye container

Referring to FIG. 3, each container 10 neck 18 is equipped with a second locking adapter 20, complimentary to the first locking adapter 16, for example, the complimentary component of a luer-lock. Preferably, the neck 18 of each container 10 will also incorporate an air-tight seal 22, such as a ring-stopper (see FIG. 14) to prevent leakage and oxidation of a container's 10 contents when the syringe 14 is removed. In this manner a syringe 14 can make a leak-proof connection to any container 10.

Figure 4:
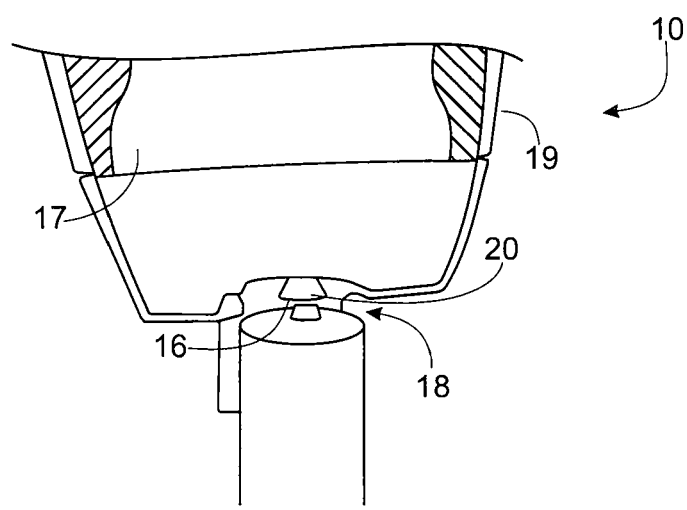
FIG. 4 is a perspective view of a syringe connected to a hair dye container.
Figure 5:
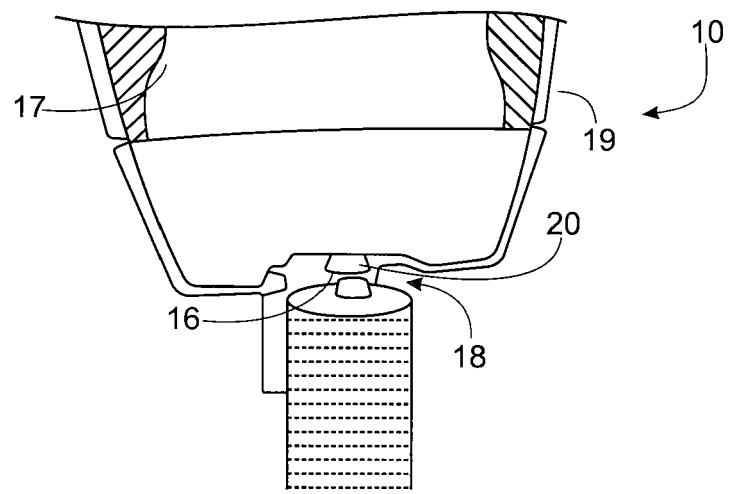
FIG. 5 is a perspective view of a syringe extracting dye from a hair dye container.

Referring to FIG. 4, in order to use the system, a user selects a color from among the containers 10 disposed in the rack 12. With the desired color selected, the piston syringe 14 is brought to the neck 18 of a container such that the first locking adapter 16 engages the second locking adapter 20, and the air-tight seal 22 is broken, allowing dye to enter the syringe 14 under negative pressure as shown in FIG. 5. Preferably, when the first locking adapter 16 and second locking adapter 20 are connected, they form an air-tight seal. Users may locate and dispense a known quantity of a known dye quickly when preparing a hair coloring mixture due to the organization of the containers in the rack 12 (not shown).

Figure 6:
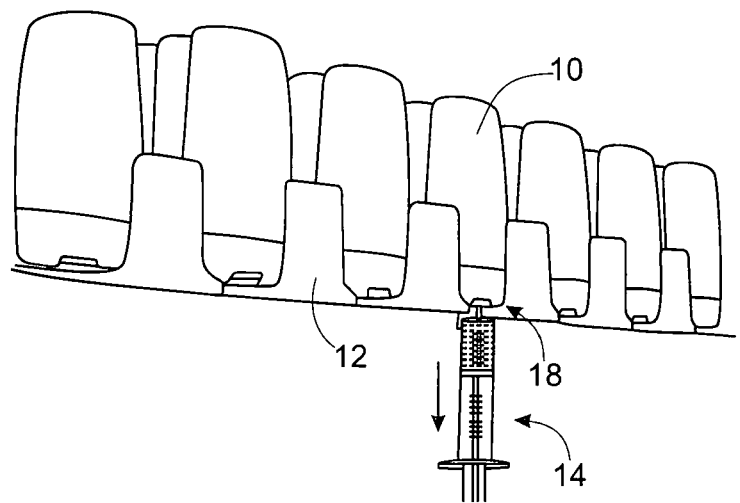
FIG. 6 is a perspective view of a syringe disconnecting from a hair dye container without leakage.

Referring to FIG. 6, after a desired quantity of a given dye has been transferred to a syringe 14, the syringe may be disengaged with the container 10. In the case of a luer-lock adapter 16, 20, the user would simply turn the syringe 14 relative to the container 10 while the container 10 is held in the rack 12 and prevented from turning by a pressure fit or obstruction fit between the rack 12 and the neck 18 of the container 10. Importantly, once the syringe 14 disengages the second locking adapter 20 and seal 22, the seal 22 closes, re-creating an air-tight seal, and preventing the contents of the container 10 from leaking. In this manner, no dye is wasted during dispensing. Also, a low viscosity dye may be easily used without spillage.

Figure 7:
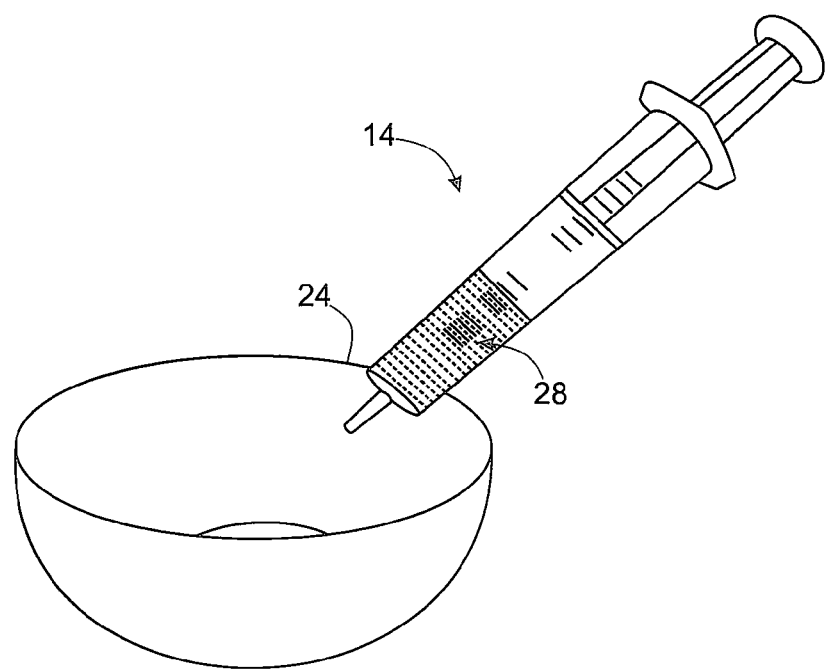
FIG. 7 is a perspective view of a syringe dispensing hair dye in to a mixing container.

Referring to FIG. 7, once a user obtains a syringe 14 with the desired quantity of dye, the dye may be dispensed into a mixing receptacle 24 where it will be combined with other pigments, and developer as desired to achieve a specific, easily and accurately duplicated hair color. After the syringe 14 dispenses the dyes, it may be easily cleaned under running water before being re-used with other dyes or developers for other salon customers.

Figure 8:
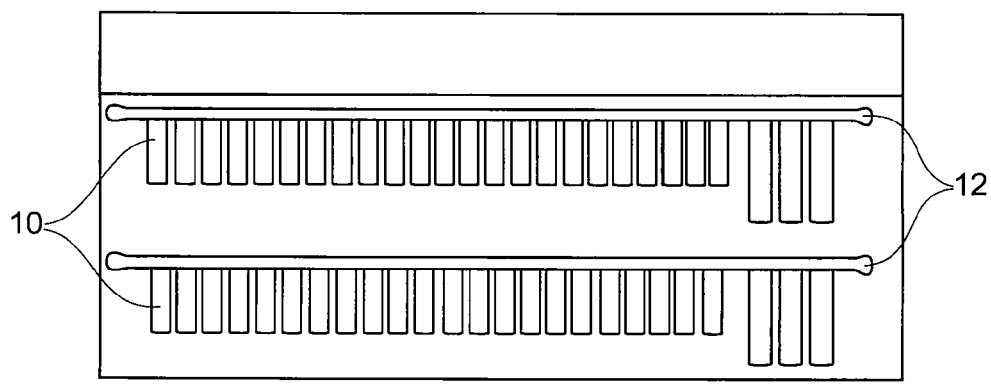
FIG. 8 is a side view of a series of bag-type hair dye containers disposed in a horizontal hanging rack.
Figure 9:
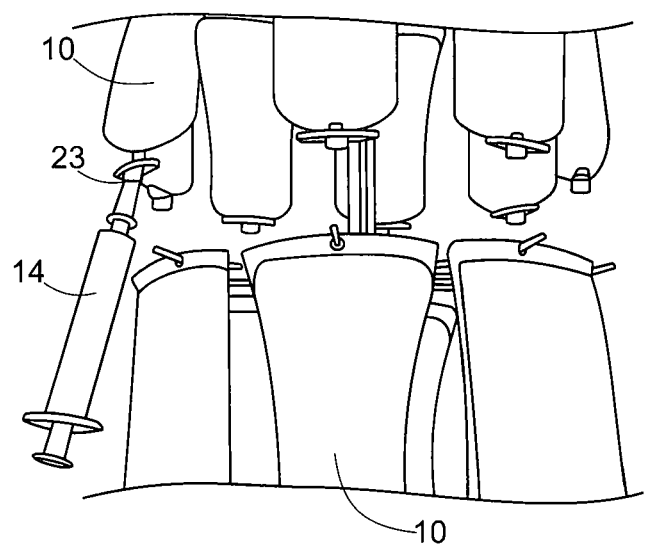
FIG. 9 is a close-up perspective view of a syringe extracting hair dye from a bag-type container having re-sealable closure.
Figure 10:
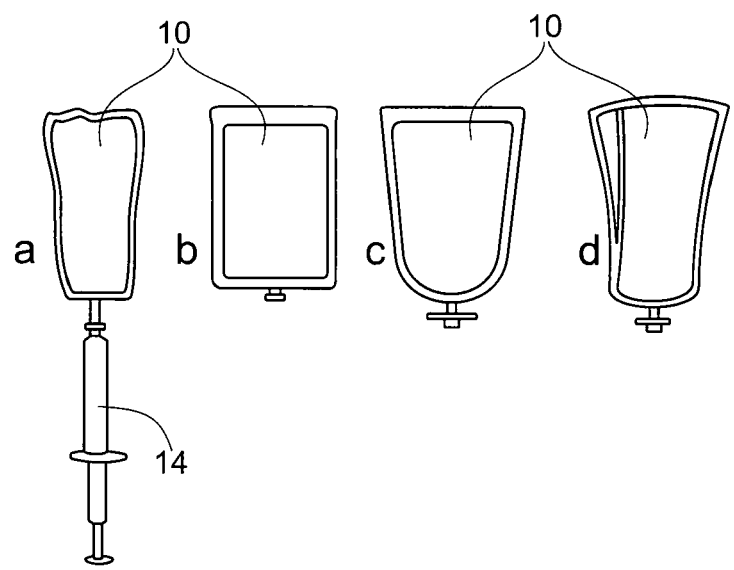
FIG. 10 is a plan view of a variety of bag-type hair dye containers and a connecting syringe.

Referring to FIGS. 8-10, embodiments of the invention comprising the aforementioned "IV Bag" type of container 10 are shown. FIG. 8 shows a series of color containers 10 assembled in a rack designed to suspend individual containers in an organized and easy to access manner. The system may comprise horizontal and expandable storage racks 12 that holed the containers 10 such that an entire professional hair color product line and developer is contained in a rack 12. The containers 10 securely hung from the storage racks 12 may be mounted on a wall in a salon in a highly organized and accessible manner. In FIG. 9, the containers are shown on an alternative carousel type rack. In this view re-sealable locking connectors 23 at the base of a bag-type color container 10 is shown connected to a syringe 14. The container may also include a shut-off valve 24 for stopping the flow of hair dye once the syringe is removed. FIG. 10 shows a variety of bag-type dye container with an adjacent syringe prepared for extracting dye from the container.

Figure 11:
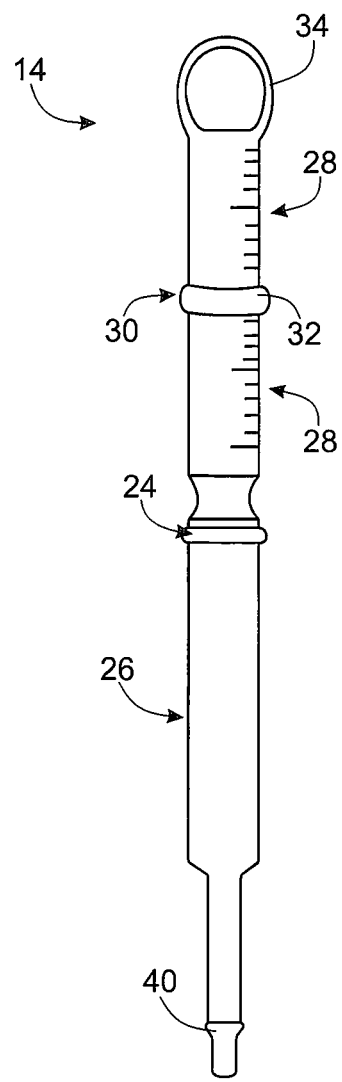
FIG. 11 is a side view of individual dye-containing syringes

Referring to FIG. 11, in an alternative embodiment, a single barrel syringe 14 may be manufactured with a predetermined quantity of dye pre-installed in the syringe 14. Each syringe in this embodiment may have a unique color or shade inside, while a multi-layered oxygen-free barrier 24 lines the inside of the syringe barrel 26. Due to the opacity of the oxygen-free barrier 24, the color of the dye contained in the syringe 14 may be applied or labeled on the barrel 26 exterior. In order to ensure accurate dispensing, the syringe graduations 28 are preferably located on the plunger 30 designed to align with a marker 32. In one embodiment, a screw-cap (not shown) may be installed at the end of the barrier, to provide a measurement guide. A handle 34 may be installed on the plunger 30 for incorporating multiple single syringes 14 into a rack system (not shown) bearing a variety of colors.

In this manner, syringes 14 with commonly used colors may be purchased separately from other, less used colors. A plurality of these syringes 14 may be used to store the entire color line of a manufacturer. In one embodiment a single pre-loaded syringe may be a common 150 ml syringe, in other embodiments larger or smaller syringes may be employed as desired, including using a larger, 250 ml or greater syringe for commonly used colors to avoid syringe replacement.

Figure 12:
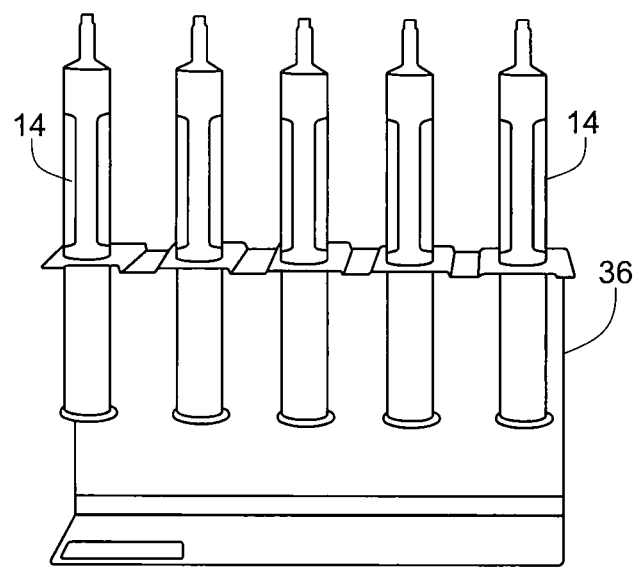
FIG. 12 is a side view of dye-containing syringes in a rack.

Referring to FIG. 12, the single pre-loaded syringes 14 may be stored in vertical rows on a horizontal rack 36 and removed by a stylist to dispense a desired quantity of pigment into a mixing bowl. Other syringes 14 of the same color may be stored behind the syringe-in-use. In an embodiment where individual syringes are removed and re-installed on a rack, each syringe plunger and/or barrel may also include indicia 38 matching indicia on the rack to ensure proper replacement of a syringe 14 after use. A cap 40 is preferably provided for each individual syringe 14 to prevent contamination by other colors.

Figure 13:
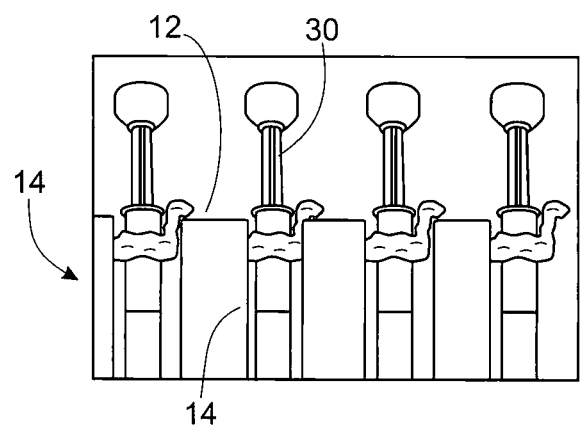
FIG. 13 is a side view of an alternate embodiment of dye-containing syringes in a rack.

Referring to FIG. 13, an alternative embodiment may include a syringe 14 securely suspended from a rack 12. In this embodiment, a front syringe in use is shown however other syringes of the same color may be stored on the rack behind the secured front syringe for replacing it when empty. In this embodiment, a stylist may hold a mixing bowl (not shown) under the securely mounted syringe 14 and depresses the plunger 30 to dispense color into the bowl. It is anticipated the viscosity typical of hair dyes is such that without pressure on the plunger 30, even when inverted with the hub of the syringe 14 pointing downward, dye will not leak from the syringe 14. Notwithstanding this property of the dye, a cap (not shown) may be proved for the tip of each syringe 14 to prevent cross-contamination and oxidation from occurring.

In this manner a complete hair color line may be pre-packaged into a plurality of single-barreled, disposable plastic dose syringes 14. The syringes 14 are preferably manufactured and packaged with predetermined quantities of hair color pre-loaded into the syringe 14. Each syringe 14 has a unique color or shade inside each barrel 26. A handle 34 or similar structure such as a hanger hole may be located at the top of the plunger 30 for holding multiple syringes in a vertical rack system storing a variety of colors in a color line. TO ensure accurate dispensing, the syringes 14 may be milliliter graduations located on the plunger 30 designed to alight with a marker 32 (such as an MDR ring) at the barrel 26 to provide a measurement guide and plunger 26 actuator.

The system is entirely oxygen-free so that the colorant and developer is protected from being contaminated by oxygen, as oftentimes occurs with the conventional formulation methodology. To prevent oxidation and/or corrosion from occurring from highly corrosive ammonia-based hair dye, a multi-layered barrier may line the inside and in some embodiments including the exterior of the plastic syringe barrel 26. An alternative feature to prevent oxidation and corrosion may include a fluorination barrier treatment, whereby fluorine atoms bonded to inner and outer surfaces of the syringe create a double-sided barrier.

Due to the opacity of the oxygen-free barrier, the color of the dye contained in the syringe 14 may be applied or labeled on the barrel 26 exterior. A screw-cap may also be incorporated into the end of the barrier to prevent dripping and also serve as an oxygen barrier.

As discussed, a plurality of the syringes may be used to store the entire color line of a manufacturer in a horizontal storage rack, and syringes containing commonly used colors may be purchased separately from other, with less used colors purchased more infrequently. A single pre-loaded syringe may be a common 150 ml syringe, in other embodiments larger or smaller syringes may be employed as desired, including using a larger, 250 ml or greater syringe for commonly used colors to avoid syringe replacement.

In the embodiment with separate containers 10, a manually operated, a clear, metrically calibrated reusable, needle-less 60 mL luer-lock syringe may be used. An assembly of multiple, multi-layer flex-packing containers 10 are each filled with a unique shade of hair color and developer. The color is withdrawn by the syringe to the exact millimeter from various containers 10 according to a predetermined formula and dispensed into a mixing bowl for combination.

Two unique container designs are contemplated, one for color and one for developer. A first container may contain 6 fl. ounces (i.e., 180 mL) of color. Incorporated into a spout at the bottom of the container 10 may be an airtight seal consisting of a permanently installed female to male in-line luer-lock connector with a shut off valve to prevent dripping and leakage. An oxygen barrier and highly secure connection between the pouch and syringe allows the system to be entirely oxygen-free so that the color and developer is protected from being contaminated by oxygen, as oftentimes occurs with the conventional formulation methodology.

A second container design includes a self-sealing orifice reducer 42 (see FIG. 14) that creates an airtight seal. A catheter syringe is inserted into the orifice reducer 42 to withdraw the required amount of color according to a formula. Upon withdrawal of the syringe, the opening in the orifice reducer closes firmly, preventing leakage and protecting the color from oxidation. Another container design (not shown) may be included for developer and hold approximately 33 oz.

Although preferred embodiments of the present invention have been shown and described, various modifications and substitutions may be made thereto without departing from the spirit and scope of the invention. For instance, in place of a luer-lock, another hermetically re-sealable locking connector may be used. Accordingly, it is to be understood that the invention has been described by way of illustration and not limitation.

What is claimed is:

1. An apparatus for preparing a hair coloring comprising:
    a graduated measuring and dispensing vessel;
    a container having a hair dye contained therein, the container comprising an air-tight chamber and an opening;
    the container further including means for engaging the container with a container holder to support the container;
    an air-tight reclosing seal at the opening, such that when the measuring and dispensing vessel engages the air-tight reclosing seal, the hair dye may be extracted from the air-tight chamber, and when the measuring and dispensing vessel is disengaged from the container, the air-tight reclosing seal closes off the air-tight chamber; and
    thereby permitting a known quantity of the hair dye to be withdrawn from the container into the measuring and dispensing vessel, allowing an accurate and repeatable quantity of hair dye to be dispensed from the container.

2. The apparatus of claim 1 wherein the container includes an engaging device at the opening for releasably connecting the measuring and dispensing vessel to the container in an air-tight manner.

3. The apparatus of claim 1 wherein the container includes an outer layer made of a semi-rigid poly-plastic material.

4. The apparatus of claim 1 wherein the opening is at the bottom of the container relative to a container label.

5. The apparatus of claim 1 wherein the air-tight reclosing seal comprises a self-sealing orifice reducer.

6. The apparatus of claim 1 wherein the container holder comprises a rack capable of holding multiple containers.

7. The apparatus of claim 6 wherein the multiple containers hang suspended from the rack.

8. The apparatus of claim 6 wherein the rack holds multiple containers of the same color in a row, such that a full container may be brought forward when an empty container is removed from the rack.

9. The apparatus of claim 1 wherein the measuring and dispensing vessel comprises a reusable syringe.

10. The apparatus of claim 1 wherein the opening and the measuring and dispensing vessel comprise a luer-lock arrangement with a shut-off valve.

11. The apparatus of claim 1 wherein the measuring and dispensing vessel comprises an oxygen-free barrier.

12. The apparatus of claim 1 wherein the surfaces of the measuring and dispensing vessel are treated with a fluorination barrier treatment.

13. The apparatus of claim 1 further comprising a mixing bowl for mixing dispensed hair dyes.

14. A method of coloring hair, comprising the steps of:
providing a first container having a quantity of hair dye contained therein;
providing a first opening in the first container with an air-tight re-closable seal on the first container;
providing a graduated measuring and dispensing vessel capable of holding a predetermined quantity of hair dye;
accessing the first opening with the graduated measuring and dispensing vessel and withdrawing a first predetermined quantity of hair dye from the first container;
dispensing the first predetermined quantity of hair dye into a mixing bowl;
providing a second container having a quantity of hair dye contained therein;
providing a second opening in the second container with an air-tight re-closable seal on the second container;
accessing the second opening with the graduated measuring an dispensing vessel and withdrawing a second predetermined quantity of hair dye from the second container;
dispensing the second predetermined quantity of hair dye into the mixing bowl; and
mixing the first predetermined quantity of hair dye and second predetermined quantity of hair dye together.

15. The method of claim 14 further comprising the step of providing an oxygen barrier on the graduated measuring and dispensing vessel.

16. The method of claim 14 further comprising the step of providing a rack for the first container and the second container.

17. The method of claim 16 further comprising the step of loading additional containers having quantities of different hair dye colors in the rack.

* * * * *